(12) United States Patent
Luo et al.

(10) Patent No.: US 12,278,048 B2
(45) Date of Patent: Apr. 15, 2025

(54) ELECTROCHEMICAL ENERGY STORAGE DEVICE

(71) Applicant: AVX New Energy (Chengdu) Co., Ltd, Sichuan (CN)

(72) Inventors: Junqiang Luo, Sichuan (CN); Guangyong Dong, Sichuan (CN); Dezhong Chen, Sichuan (CN); Jie Xiang, Sichuan (CN); Fanghui Zhao, Sichuan (CN)

(73) Assignee: KYOCERA AVX Components (Chengdu) Co., Ltd., Chengdu (CN)

( * ) Notice: Subject to any disclaimer, the term of this patent is extended or adjusted under 35 U.S.C. 154(b) by 469 days.

(21) Appl. No.: 17/618,529

(22) PCT Filed: Jun. 8, 2020

(86) PCT No.: PCT/CN2020/094924
§ 371 (c)(1),
(2) Date: Jun. 23, 2022

(87) PCT Pub. No.: WO2020/248939
PCT Pub. Date: Dec. 17, 2020

(65) Prior Publication Data
US 2022/0351918 A1    Nov. 3, 2022

(30) Foreign Application Priority Data
Jun. 11, 2019  (CN) .......................... 201910502336.0

(51) Int. Cl.
H01G 11/74    (2013.01)
H01G 11/58    (2013.01)
H01G 11/80    (2013.01)

(52) U.S. Cl.
CPC ............. *H01G 11/74* (2013.01); *H01G 11/80* (2013.01); *H01G 11/58* (2013.01)

(58) Field of Classification Search
CPC ........ H01G 11/82; H01G 11/14; H01G 11/80; H01G 11/74
See application file for complete search history.

(56) References Cited

U.S. PATENT DOCUMENTS

| 6,526,799 B2 | 3/2003 | Ferraro et al. |
| 11,532,441 B2 | 12/2022 | Hansen |

(Continued)

FOREIGN PATENT DOCUMENTS

| CN | 202887989 | | 4/2013 |
| CN | 202887989 U | * | 4/2013 |

(Continued)

OTHER PUBLICATIONS

EESR for EP patent application No. 20822217.4 dated Jun. 12, 2023, 10 pages.

(Continued)

*Primary Examiner* — David M Sinclair
(74) *Attorney, Agent, or Firm* — Dority & Manning, P.A.

(57) ABSTRACT

Disclosed is an electrochemical energy storage device, belonging to the technical field of electrochemical energy storage devices. The electrochemical energy storage device comprises: a cover plate (6), which comprises a lead-out column (61) and a fixation plate (62), wherein the lead-out column (61) is an electric conductor, the fixation plate (62) is an insulator, and the lead-out column (61) is fixed on the fixation plate (62) in a vertically penetrating manner; an outer housing (1), which is cylindrical, wherein an opening is provided at at least one end of the outer housing, and the fixation plate (62) is connected to the opening of the outer housing (1) in a sealed manner by means of a sealing ring (9); and a roll core (3), which is arranged at an inner cavity of the outer housing (1), wherein the roll core (3) is welded to a side face of the lead-out column (61) by means of an upper connection piece (4) to achieve electrically conductive (Continued)

connection, and connected in an electrically conductive manner to the other lead-out end of the outer housing (1) by means of a lower connection piece (2); and an upper roll edge (42) used for sheathing the roll core (3) is arranged at a periphery of the upper connection piece (4), and a periphery of the lead-out column (61) and the upper roll edge (42) of the upper connection piece (4) are fixed by means of side-face laser welding. The electrochemical energy storage device has the advantages that the internal resistance is small, the strength is high, the stability is good, and anti-vibration performance can be improved in the process of use.

12 Claims, 7 Drawing Sheets

(56) References Cited

U.S. PATENT DOCUMENTS

| | | | |
|---|---|---|---|
| 2002/0110729 A1* | 8/2002 | Hozumi | H01M 10/0431 |
| | | | 429/211 |
| 2009/0087733 A1 | 4/2009 | Yoon et al. | |
| 2014/0268496 A1* | 9/2014 | Lee | B23K 26/0823 |
| | | | 361/502 |
| 2014/0293510 A1* | 10/2014 | Miura | H01G 11/52 |
| | | | 361/502 |
| 2016/0343997 A1 | 11/2016 | Sekiya et al. | |
| 2020/0219667 A1 | 7/2020 | Hansen | |

FOREIGN PATENT DOCUMENTS

| | | | | |
|---|---|---|---|---|
| CN | 203746672 | | 7/2014 | |
| CN | 106920703 | | 7/2017 | |
| CN | 207165430 | | 3/2018 | |
| CN | 208000833 | | 10/2018 | |
| CN | 110112011 | | 8/2019 | |
| CN | 209947675 | | 1/2020 | |
| JP | H10275751 | | 10/1998 | |
| JP | H1167185 | | 3/1999 | |
| JP | 2002100342 | | 4/2002 | |
| JP | 2002100342 A | * | 4/2002 | ........ H01M 10/0587 |
| JP | 2005129433 A | | 5/2005 | |
| JP | 2014209526 | | 11/2014 | |
| KR | 20180021952 | | 3/2018 | |
| WO | WO2005076296 | | 8/2005 | |

OTHER PUBLICATIONS

International Search Report for PCT/CN2020/094924 mailed Sep. 3, 2020, 3 pages.

* cited by examiner

ELECTROCHEMICAL ENERGY STORAGE DEVICE

TECHNICAL FIELD

The present invention relates to the technical field of electrochemical energy storage devices, and more specifically, to an electrochemical energy storage device.

BACKGROUND

A super capacitor is also referred to as an electrochemical capacitor, and is an electrochemical element that stores energy by using a polarized electrolyte. It has a high power density, a short charging time, and a long service life. More and more attention is paid to this auxiliary energy source in a storage system of an electric vehicle and a smart grid. A structure in which a positive electrode and a negative electrode of a capacitor are located at the same end of an outer housing is referred to as a one-end lead-out capacitor. Large- and medium-sized capacitors usually adopt a two-end lead-out form, and the internal resistance of a super capacitor of the two-end lead-out structure is much lower than that of the one-end lead-out structure, so that a larger current discharge can be implemented, thereby improving power performance of the super capacitor.

Currently, an aluminum cover plate is usually used for an electrode of a two-end lead-out capacitor, and an external outer housing is also an aluminum structure. A sealing connection needs to be maintained between the cover plate and the outer housing, and an insulation pad needs to be arranged between the cover plate and the outer housing. However, the cover plate and the outer housing may still be at a risk of mutual conduction, which causes an entire capacitor failure.

SUMMARY

An objective of the present invention is to provide an electrochemical energy storage device, where a cover plate has a good insulation effect, and upper and lower connection pieces are separately welded to an outer housing and the cover plate by means of laser, which has the advantage of small internal resistance.

To implement the foregoing objective, the following technical solutions are used in the present invention:

an electrochemical energy storage device, comprising: a cover plate, which comprises a lead-out column and a fixation plate, wherein the lead-out column is an electric conductor, the fixation plate is an insulator, and the lead-out column is fixed on the fixation plate in a vertically penetrating manner; an outer housing, which is cylindrical, wherein an opening is provided at at least one end of the outer housing, and the fixation plate is connected to the opening of the outer housing in a sealed manner by means of a sealing ring; and a roll core, which is arranged at an inner cavity of the outer housing, wherein the roll core is welded to a side face of the lead-out column by means of an upper connection piece to achieve electrically conductive connection, and connected in an electrically conductive manner to the other lead-out end of the outer housing by means of a lower connection piece; and an upper roll edge used for sheathing the roll core is arranged at a periphery of the upper connection piece, and a periphery of the lead-out column and the upper roll edge of the upper connection piece are fixed by means of side-face laser welding.

Further, a lower roll edge used for sheathing the roll core is arranged on a periphery of the lower connection piece, and a lower end inner wall of the outer housing protrudes inward to form a protrusion, which is configured to closely fit and position with the lower roll edge of the lower connection piece; a groove is provided on a side wall of the outer housing at a position opposite to the protrusion, and the lower roll edge and the protrusion are fixed and electrically connected by means of laser penetration welding at the groove.

Further, the cover plate is in an annular step shape, and the lead-out column is arranged at the center of the fixation plate.

Further, the fixation plate is in a step form of increasing from top to bottom, a sealing groove is provided on the fixed step, the sealing ring is arranged in the sealing groove, the insulated fixation plate is connected to the opening of the outer housing in a sealed manner by means of the sealing ring, an upper end of the lead-out column is a first cylinder, the diameter of the first cylinder is smaller than the diameter of the step of the fixation plate, and a top surface of the first cylinder is higher than an outer surface of the fixation plate; a lower end of the lead-out column is a second cylinder, and the diameter of the second cylinder is less than the outer diameter of the fixation plate, and is higher than an inner surface of the fixation plate.

Further, the lead-out column is an aluminum column, the fixation plate is a resin plate, and both the upper connection piece and the lower connection piece are aluminum plates.

Further, an upper positioning hole of the upper roll edge is provided at the center of the upper connection piece, and a lower positioning hole used for penetrating into a center roll pin hole of the roll core to position and fix the lower roll edge of the roll core is provided at the center of the lower connection piece.

Further, a liquid injection hole for injecting an electrolyte into the roll core is provided by running through the lead-out column, and the liquid injection hole keeps internal and external isolation sealing by using a sealing element, and a positioning column that is in communication with the liquid injection hole and that is used for positioning with the upper positioning hole of the upper connection piece is arranged at the center of an inner surface of the lead-out column.

Further, a mounting hole coaxial with the liquid injection hole is provided at one end of the liquid injection hole near the first cylinder, the diameter of the mounting hole is greater than the diameter of the liquid injection hole, a rubber plug and an aluminum plug are successively arranged in the liquid injection hole, the aluminum plug is fixed in the mounting hole, and the aluminum plug and the first cylinder of the lead-out column are welded by laser.

Further, a plurality of upper through holes for absorbing an electrolyte by the roll core are provided on the upper connection piece, and a plurality of lower through holes for absorbing the electrolyte by the roll core are provided on the lower connection piece.

Further, an outer surface of the upper connection piece is wrapped with a high-temperature-resistant insulating heat-shrinkable sleeve, and the opening of the outer housing is provided with a flared opening for fixing the cover plate.

Beneficial effects of the present invention compared with the prior art are as follows:

1. The present invention provides an electrochemical energy storage device, comprising: a cover plate, an outer housing, and a roll core. The cover plate comprises a lead-out column and a fixation plate, the lead-out column is an electric conductor, the fixation plate is an insulator, and the lead-out column is fixed on the fixation plate in a vertically penetrating manner. The outer housing is cylindrical, an opening is provided at at least one end of the outer housing, and the insulated fixation plate is connected to the opening of the outer housing in a sealed manner. The roll core is arranged at an inner cavity of the outer housing. The roll core is conductively connected to the lead-out column by means of the upper connection piece, and the lower connection piece is conductively connected to the other lead-out end of the outer housing. The roll core is laser welded to the upper connection piece and the lower connection piece, a periphery of the lead-out column is fixed to an upper roll edge of the upper connection piece by means of side-face laser welding, and a lower roll edge of the lower connection piece is fixed to a protrusion of the outer housing at a groove by means of laser penetration welding. This structure ensures low internal resistance of the product. The upper and lower connection pieces respectively lead out positive and negative electrodes of a capacitor and lead the positive and negative electrodes to the outside. The cover plate is composed of the lead-out column and the fixation plate, which are fixed as an integral structure. The lead-out column is insulated from the outer housing by means of the fixation plate, and no other insulation material is needed, thus providing a better insulation effect.

2. A mounting hole coaxial with the liquid injection hole is provided at one end of the liquid injection hole near the first cylinder, the diameter of the mounting hole is greater than the diameter of the liquid injection hole, a rubber plug and an aluminum plug are successively arranged in the liquid injection hole, the aluminum plug is fixed in the mounting hole, and the aluminum plug and the first cylinder of the lead-out column are welded by laser. In the design of this structure, the laser welding route avoids the rubber plug during the welding of the aluminum plug, so as to avoid damage to the rubber plug, and the welding is stronger.

3. The inner side of the lower end of the outer housing of the present invention protrudes inward to form a protrusion, which is configured to closely fit with the lower connection piece. A groove is provided on a surface of the outer housing corresponding to the protrusion, so as to facilitate welding of the outer housing and the lower connection piece. The lower connection piece is welded to an inner wall of the outer housing by using this structure instead of a bottom surface of the end, causing small internal resistance, high strength, and good stability. When in use, the lower connection piece and the outer housing can provide improved robustness and good anti-vibration performance.

Figure 1:
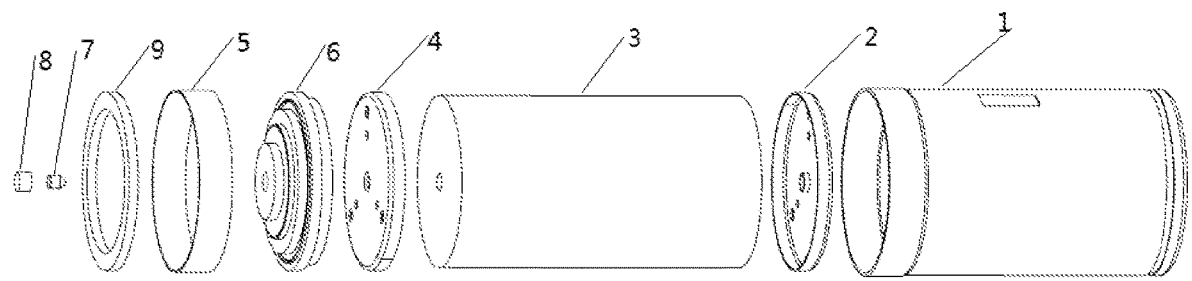
FIG. 1 is an explosion structure diagram of an electrochemical energy storage device according to the present invention.

Reference numerals: 1—outer housing, 2—lower connection piece, 3—roll core, 4—upper connection piece, 5—insulating heat-shrinkable sleeve, 6—cover plate, 7—rubber plug, 8—aluminum plug, 9—sealing ring, 11—groove, 12—protrusion, 13—flared opening, 21—lower positioning hole, 22—lower roll edge, 23—lower through hole, 31—roll pin hole, 41—upper positioning hole, 42—upper roll edge, 43—upper through hole, 61—lead-out column, 62—fixation plate, 611—liquid injection hole, 612—positioning column, 613—mounting hole.

DETAILED DESCRIPTION

The following further describes the present invention with reference to the embodiments. The described embodiments are merely some instead of all of the embodiments of the present invention. All other embodiments obtained by a person of ordinary skill in the art based on the embodiments of the present invention without creative efforts shall fall within the protection scope of the present invention.

Embodiment 1

Figure 2:
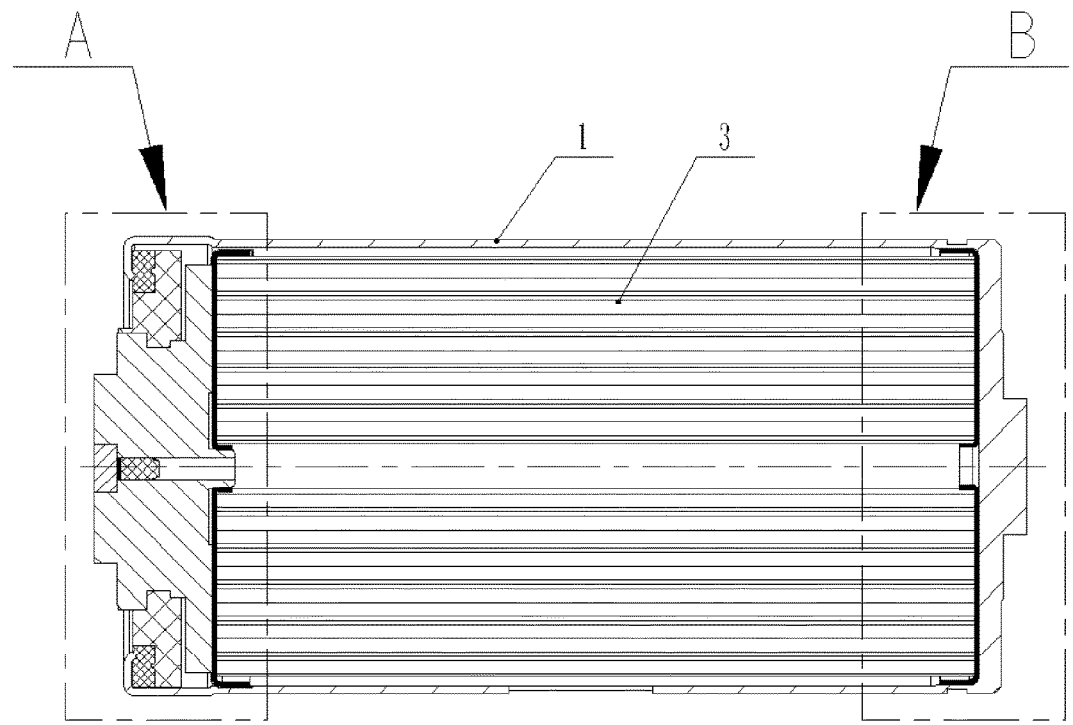
FIG. 2 is a schematic structural diagram of an electrochemical energy storage device according to the present invention after mounting and configuration.
Figure 3:
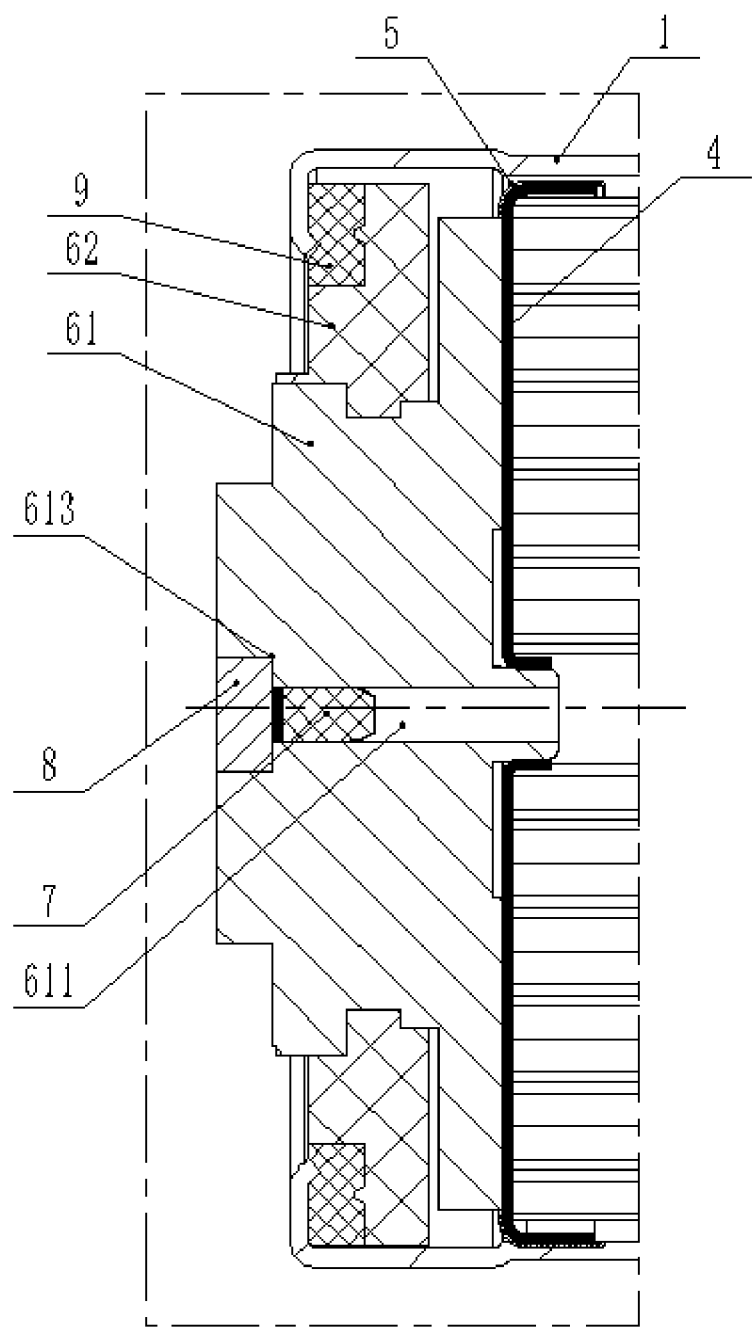
FIG. 3 is a partially enlarged schematic diagram of A in FIG. 2.
Figure 6:
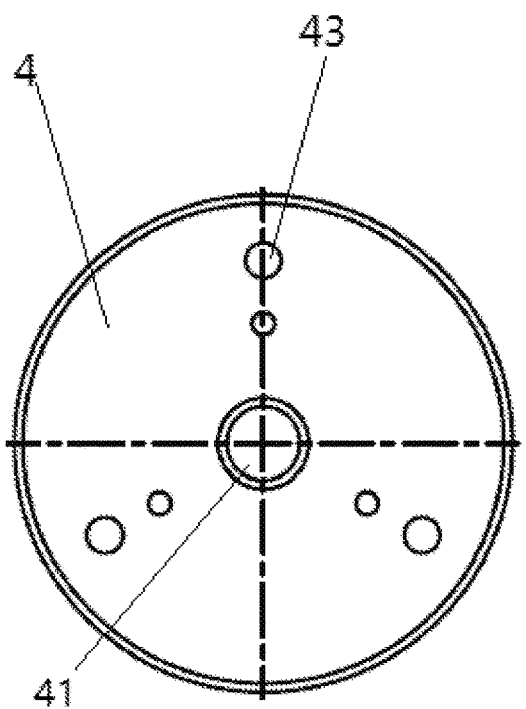
FIG. 6 is a schematic diagram of an upper connection piece of an electrochemical energy storage device according to the present invention.
Figure 7:
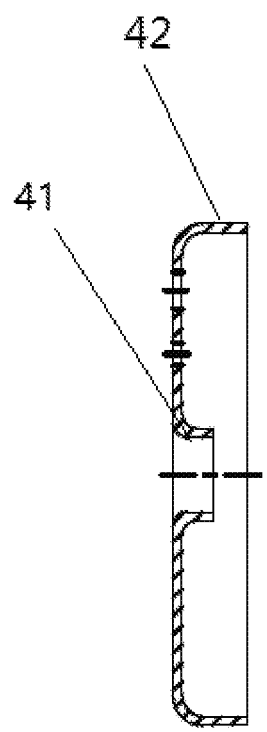
FIG. 7 is a schematic structural diagram of an upper connection piece of an electrochemical energy storage device according to the present invention.

As shown in FIG. 1-3, an electrochemical energy storage device comprises: a cover plate 6, which comprises a lead-out column 61 and a fixation plate 62, wherein the lead-out column 61 is an electric conductor, the fixation plate 62 is an insulator, the lead-out column 61 is fixed on the fixation plate 62 in a vertically penetrating manner, and the lead-out column 61 has a stud or light column at its end to facilitate connection between individual elements; an outer housing 1, which is cylindrical, wherein an opening is provided at at least one end of the outer housing, and the fixation plate 62 is connected to the opening of the outer housing 1 in a sealed manner by means of a sealing ring; and a roll core 3, which is arranged at an inner cavity of the outer housing 1, wherein the roll core 3 is welded to a side face of the lead-out column 61 by means of an upper connection piece 4 to achieve electrically conductive connection, and connected in an electrically conductive manner to the other lead-out end of the outer housing 1 by means of a lower connection piece 2; as shown in FIGS. 6 and 7, an upper roll edge 42 used for sheathing the roll core 3 is arranged at a periphery of the upper connection piece 4, an upper positioning hole 41 of the upper roll edge 42 is provided at the center of the upper connection piece 4, the roll edge of the upper positioning hole 41 is placed into the roll core 3 hole, and the periphery of the lead-out column 61 and the upper roll edge 42 of the upper connection piece 4 are fixed by means of side-face laser welding.

In this embodiment, the cover plate 6 is in an annular step shape, and the lead-out column 61 is arranged at the center of the fixation plate 62. In this embodiment, the lead-out column 61 is an aluminum column, the fixation plate 62 is a resin plate, and both the upper connection piece 4 and the lower connection piece 2 are aluminum plates. The outer housing 1 is also made of an aluminum material.

Figure 5:
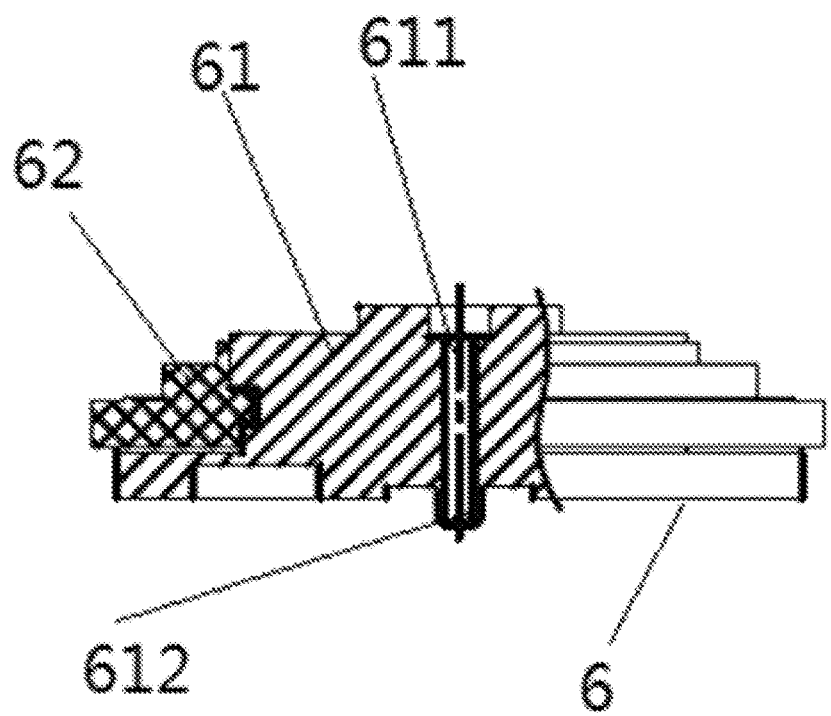
FIG. 5 is a schematic structural diagram of a cover plate of an electrochemical energy storage device according to the present invention.

As shown in FIG. 5, in this embodiment, the fixation plate 62 is in a step form of increasing from top to bottom, a sealing groove is provided on the fixed step, the sealing ring 9 is arranged in the sealing groove, an upper end of the lead-out column 61 is a first cylinder, the diameter of the first cylinder is smaller than the diameter of the step of the fixation plate 62, and a top surface of the first cylinder is higher than an outer surface of the fixation plate 62; a lower end of the lead-out column 61 is a second cylinder, and the diameter of the second cylinder is less than the outer diameter of the fixation plate 62, and is higher than an inner surface of the fixation plate 62. An outer surface of the upper connection piece 4 is wrapped with a high-temperature-resistant insulating heat-shrinkable sleeve 5, and the insulating heat-shrinkable sleeve 5 is connected to the upper connection piece to wrap a welding portion of the lead-out column 61 together, so as to avoid contact between the upper connection piece 4 and the outer housing 1, and the opening of the outer housing 1 is provided with a flared opening 13 for fixing the cover plate 6. The flared opening 13 also facilitates placement of the insulating heat-shrinkable sleeve 5.

In this embodiment, the periphery of the lead-out column 61 and the upper roll edge 42 of the upper connection piece 4 are fixed by means of side-face laser welding, and welding of this structure is performed on the periphery of the lead-out column 61 instead of using a conventional tight fit, which has high strength, good stability, low internal resistance, and good anti-vibration performance.

Embodiment 2

Figure 4:
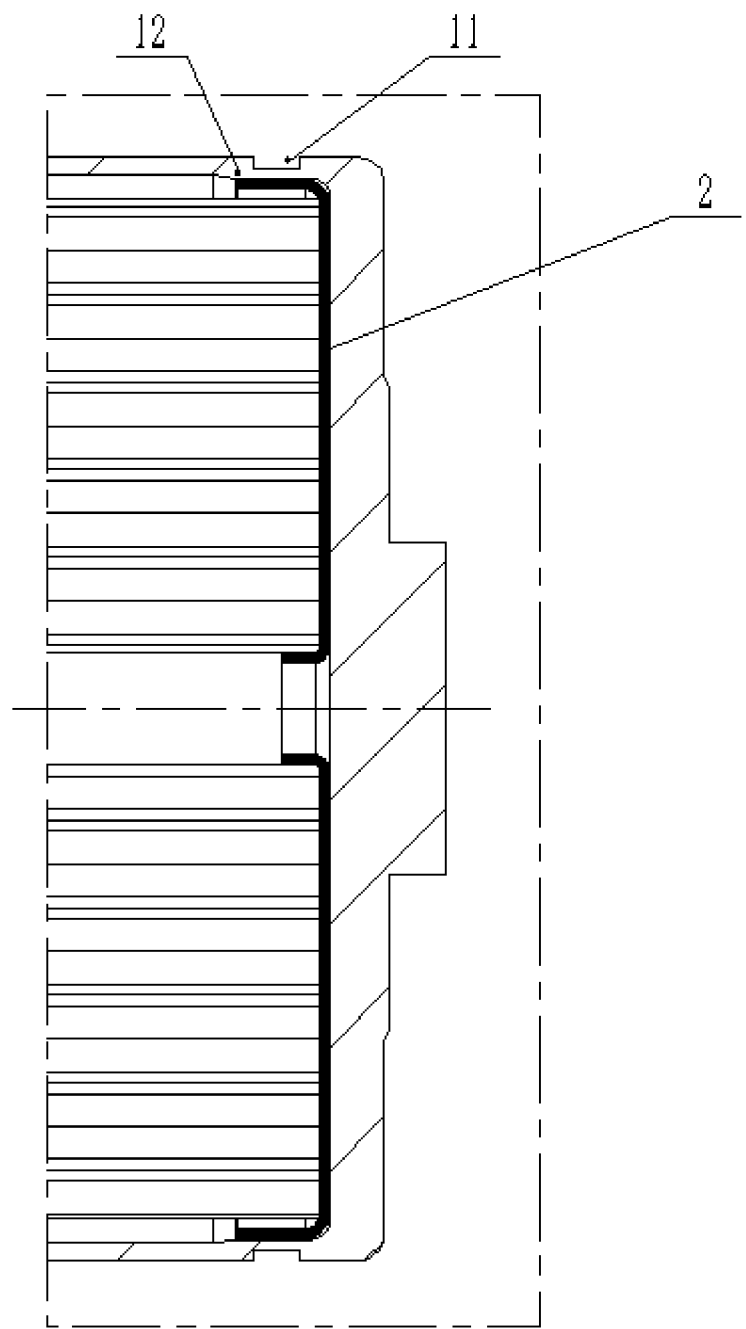
FIG. 4 is a partially enlarged schematic diagram of B in FIG. 2.
Figure 8:
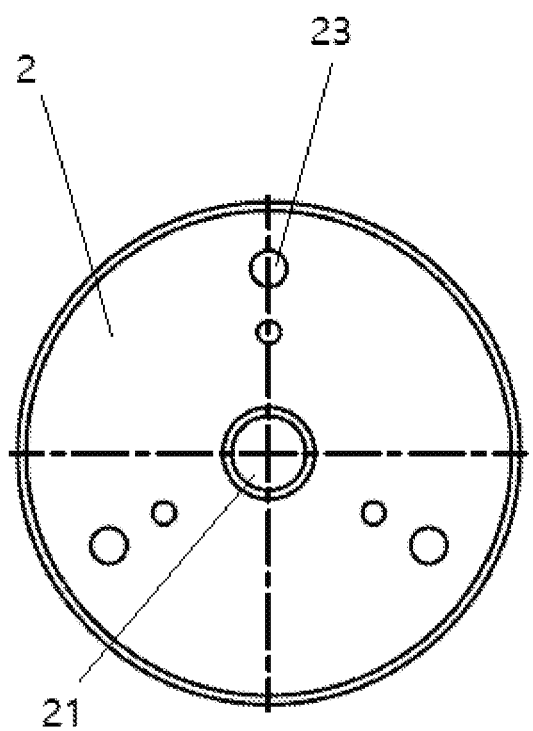
FIG. 8 is a schematic structural diagram of a lower connection piece of an electrochemical energy storage device according to the present invention.
Figure 9:
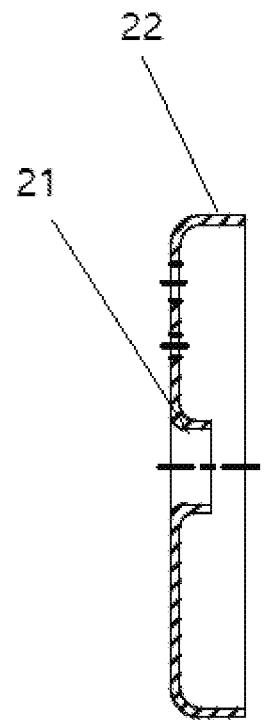
FIG. 9 is a schematic structural diagram of a lower connection piece of an electrochemical energy storage device according to the present invention.
Figure 10:
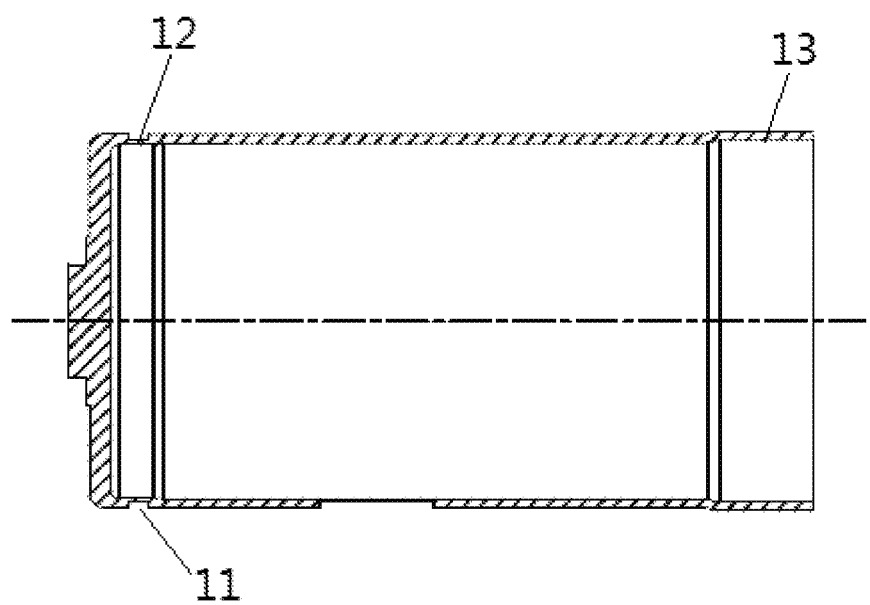
FIG. 10 is a schematic structural diagram of an outer housing of an electrochemical energy storage device according to the present invention.
Figure 11:
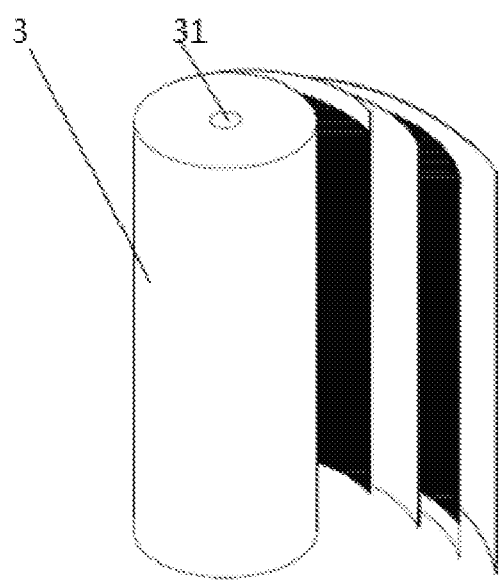
FIG. 11 is a schematic structural diagram of a roll core of an electrochemical energy storage device according to the present invention.

This embodiment is further optimized on the basis of Embodiment 1. In this embodiment, improvements compared with Embodiment 1 are mainly described. The same content is not described. In this embodiment, as shown in FIGS. 8 and 9, a lower positioning hole 21 is provided at the center of the lower connection piece 2, a roll edge of the lower positioning hole 21 is placed in a roll pin hole 31 of the roll core, and the periphery of the lower connection piece 2 is provided with a lower roll edge 22 for sheathing the roll core 3. As shown in FIGS. 4 and 10, a lower end inner wall of the outer housing 1 protrudes inward to form a protrusion 12, which is configured to closely fit and position with the lower roll edge 22 of the lower connection piece 2, a groove 11 is provided on a side wall of the outer housing 1 at a position opposite to the protrusion 12, and the lower roll edge 22 and the protrusion 12 are fixed and electrically connected by means of laser penetration welding at the groove 11.

The inner side of the lower end of the outer housing 1 in this embodiment protrudes inward to form a protrusion 12, which is configured to closely fit with the lower connection piece 2. A groove 11 is provided on a surface of the outer housing 1 corresponding to the protrusion 12, so as to facilitate welding of the outer housing 1 and the lower connection piece 2. The lower connection piece 2 is welded to an inner wall of the outer housing 1 by using this structure instead of a bottom surface of the end, causing small internal resistance, high strength, and good stability. When in use, the lower connection piece 2 and the outer housing 1 can provide improved robustness and good anti-vibration performance. More preferably, the protrusion 12 is an annular protrusion 12, the welding surface is larger, the internal resistance value is smaller, the welding strength is higher, and the anti-vibration performance is better. Setting of the groove 11 reduces the thickness of the outer housing 1 at the welding portion, reduces difficulty in a production manufacturing process, and facilitates production.

In this embodiment, the upper roll edge 42 of the upper connection piece 4 and the lower roll edge 22 of the lower connection piece 2 respectively wrap the roll core 3, and the high-temperature-resistant insulating heat-shrinkage sleeve 5 of the upper connection piece 4 tightly fits with the inner wall of the outer housing 1, and the lower roll edge 22 of the lower connection piece 2 tightly fits with the inward shrinkage annular projection 12 of the outer housing 1, so that a product has better anti-vibration performance.

Embodiment 3

As shown in FIG. 3, this embodiment is further optimized on the basis of Embodiment 2. In this embodiment, improvements compared with Embodiment 2 are mainly described. The same content is not described. In this embodiment, a liquid injection hole 611 for injecting an electrolyte into the roll core 3 is provided by running through the lead-out column 61. After the electrolyte injection is completed, the liquid injection hole 611 keeps internal and external isolation sealing by using a sealing element, and a positioning column 612 that is in communication with the liquid injection hole 611 and that is used for positioning with the upper positioning hole 41 of the upper connection piece 4 is arranged at the center of an inner surface of the lead-out column 61. The positioning column 612 facilitates positioning.

Embodiment 4

As shown in FIG. 3, this embodiment is further optimized on the basis of Embodiment 3. In this embodiment, improvements compared with Embodiment 3 are mainly described. The same content is not described. In this embodiment, a mounting hole 613 coaxial with the liquid injection hole 611 is provided at one end of the liquid injection hole 611 near the first cylinder, the diameter of the mounting hole 613 is greater than the diameter of the liquid injection hole 611, a rubber plug 7 and an aluminum plug 8 are successively arranged in the liquid injection hole 611, the aluminum plug 8 is fixed in the mounting hole 613, and the aluminum plug 8 and the first cylinder of the lead-out column 61 are welded by laser.

Preferably, a plurality of upper through holes 43 for absorbing an electrolyte by the roll core 3 are provided on the upper connection piece 4, and a plurality of lower through holes 23 for absorbing the electrolyte by the roll core 3 are provided on the lower connection piece 2, facilitating permeation of the electrolyte.

An explosion-proof valve is arranged on a side wall of the outer housing 1, so as to avoid excessive pressure inside the outer housing 1 by using the explosion-proof valve.

The foregoing descriptions are merely preferred embodiments of the present invention, and are not intended to limit the present invention. Any modification, equivalent replacement, and improvement made within the spirit and principle of the present invention shall fall within the protection scope of the present invention.

What is claimed is:

1. An electrochemical energy storage device, comprising: a cover plate (6), which comprises a lead-out column (61) and a fixation plate (62), wherein the lead-out column (61) is an electric conductor, the fixation plate (62) is an insulator, and the lead-out column (61) is integrally fixed on the fixation plate (62) in a vertically penetrating manner; an outer housing (1), which is cylindrical, wherein an opening is provided at at least one end of the outer housing, and the fixation plate (62) is connected to the opening of the outer housing (1) in a sealed manner by means of a sealing ring (9); and a roll core (3), which is arranged at an inner cavity of the outer housing (1), wherein the roll core (3) is welded to a side face of the lead-out column (61) by means of an upper connection piece (4) to achieve electrically conductive connection, and connected in an electrically conductive manner to the other lead-out end of the outer housing (1) by means of a lower connection piece (2); and an upper roll edge (42) used for sheathing the roll core (3) is arranged at a periphery of the upper connection piece (4), and a periphery of the lead-out column (61) and the upper roll edge (42) of the upper connection piece (4) are fixed by means of side-face laser welding.

2. The electrochemical energy storage device according to claim 1, wherein a lower roll edge (22) used for sheathing the roll core (3) is arranged on a periphery of the lower connection piece (2), and a lower end inner wall of the outer housing (1) protrudes inward to form a protrusion (12), which is configured to closely fit and position with the lower roll edge (22) of the lower connection piece (2); a groove (11) is provided on a side wall of the outer housing (1) at a position opposite to the protrusion (12), and the lower roll edge (22) and the protrusion (12) are fixed and electrically connected by means of laser penetration welding at the groove (11).

3. The electrochemical energy storage device according to claim 1, wherein the cover plate (6) is in an annular step shape, and the lead-out column (61) is arranged at the center of the fixation plate (62).

4. The electrochemical energy storage device according to claim 3, wherein the fixation plate (62) is in a step form of increasing from top to bottom, a sealing groove is provided on the fixed step, the sealing ring (9) is arranged in the sealing groove, an upper end of the lead-out column (61) is a first cylinder, the diameter of the first cylinder is smaller than the diameter of the step of the fixation plate (62), and a top surface of the first cylinder is higher than an outer surface of the fixation plate (62); a lower end of the lead-out column (61) is a second cylinder, and the diameter of the second cylinder is less than the outer diameter of the fixation plate (62), and is higher than an inner surface of the fixation plate (62).

5. The electrochemical energy storage device according to claim 3, wherein the lead-out column (61) is an aluminum column, the fixation plate (62) is a resin plate, and both the upper connection piece (4) and the lower connection piece (2) are aluminum plates.

6. The electrochemical energy storage device according to claim 3, wherein an upper positioning hole (41) of the upper roll edge (42) is provided at the center of the upper connection piece (4), and a lower positioning hole (21) used for penetrating into a center roll pin hole (31) of the roll core (3) to position and fix the lower roll edge (22) of the roll core (3) is provided at the center of the lower connection piece (2).

7. The electrochemical energy storage device according to claim 6, wherein a liquid injection hole (611) for injecting an electrolyte into the roll core (3) is provided by running through the lead-out column (61), and the liquid injection hole (611) keeps internal and external isolation sealing by using a sealing element, and a positioning column (612) that is in communication with the liquid injection hole (611) and that is used for positioning with the upper positioning hole (41) of the upper connection piece (4) is arranged at the center of an inner surface of the lead-out column (61).

8. The electrochemical energy storage device according to claim 7, wherein a mounting hole (613) coaxial with the liquid injection hole (611) is provided at one end of the liquid injection hole (611) near the first cylinder, the diameter of the mounting hole (613) is greater than the diameter of the liquid injection hole (611), a rubber plug (7) and an aluminum plug (8) are successively arranged in the liquid injection hole (611), the aluminum plug (8) is fixed in the mounting hole (613), and the aluminum plug (8) and the first cylinder of the lead-out column (61) are welded by laser.

9. The electrochemical energy storage device according to claim 3, wherein a plurality of upper through holes (43) for absorbing an electrolyte by the roll core (3) are provided on the upper connection piece (4), and a plurality of lower through holes (23) for absorbing the electrolyte by the roll core (3) are provided on the lower connection piece (2).

10. The electrochemical energy storage device according to claim 3, wherein an outer surface of the upper connection piece (4) is wrapped with a high-temperature-resistant insulating heat-shrinkable sleeve (5), and the opening of the outer housing (1) is provided with a flared opening (13) for fixing the cover plate (6).

11. An electrochemical energy storage device, comprising: a cover plate (6), which comprises a lead-out column (61) and a fixation plate (62), wherein the lead-out column (61) is an electric conductor, the fixation plate (62) is an insulator, and the lead-out column (61) is fixed on the fixation plate (62) in a vertically penetrating manner; an outer housing (1), which is cylindrical, wherein an opening is provided at at least one end of the outer housing, and the fixation plate (62) is connected to the opening of the outer housing (1) in a sealed manner by means of a sealing ring (9); and a roll core (3), which is arranged at an inner cavity of the outer housing (1), wherein the roll core (3) is welded to a side face of the lead-out column (61) by means of an upper connection piece (4) to achieve electrically conductive connection, and connected in an electrically conductive manner to the other lead-out end of the outer housing (1) by means of a lower connection piece (2); and an upper roll edge (42) used for sheathing the roll core (3) is arranged at a periphery of the upper connection piece (4), and a periphery of the lead-out column (61) and the upper roll edge (42) of the upper connection piece (4) are fixed by means of side-face laser welding;

wherein the fixation plate (62) is in a step form of increasing from top to bottom, a sealing groove is provided on the fixed step, the sealing ring (9) is arranged in the sealing groove, an upper end of the lead-out column (61) is a first cylinder, the diameter of the first cylinder is smaller than the diameter of the step of the fixation plate (62), and a top surface of the first cylinder is higher than an outer surface of the fixation plate (62); a lower end of the lead-out column (61) is a second cylinder, and the diameter of the second cylinder is less than the outer diameter of the fixation plate (62), and is higher than an inner surface of the fixation plate (62).

12. An electrochemical energy storage device, comprising: a cover plate (6), which comprises a lead-out column

(61) and a fixation plate (62), wherein the lead-out column (61) is an electric conductor, the fixation plate (62) is an insulator, and the lead-out column (61) is fixed on the fixation plate (62) in a vertically penetrating manner; an outer housing (1), which is cylindrical, wherein an opening is provided at at least one end of the outer housing, and the fixation plate (62) is connected to the opening of the outer housing (1) in a sealed manner by means of a sealing ring (9); and a roll core (3), which is arranged at an inner cavity of the outer housing (1), wherein the roll core (3) is welded to a side face of the lead-out column (61) by means of an upper connection piece (4) to achieve electrically conductive connection, and connected in an electrically conductive manner to the other lead-out end of the outer housing (1) by means of a lower connection piece (2); and an upper roll edge (42) used for sheathing the roll core (3) is arranged at a periphery of the upper connection piece (4), and a periphery of the lead-out column (61) and the upper roll edge (42) of the upper connection piece (4) are fixed by means of side-face laser welding;

wherein a liquid injection hole (611) for injecting an electrolyte into the roll core (3) is provided by running through the lead-out column (61), a mounting hole (613) coaxial with the liquid injection hole (611) is provided at one end of the liquid injection hole (611) near the first cylinder, the diameter of the mounting hole (613) is greater than the diameter of the liquid injection hole (611), a rubber plug (7) and an aluminum plug (8) are successively arranged in the liquid injection hole (611), the aluminum plug (8) is fixed in the mounting hole (613), and the aluminum plug (8) and the first cylinder of the lead-out column (61) are welded by laser.

* * * * *